3,562,707
DIRECTION INDICATOR SYSTEMS FOR TRACTOR-TRAILER VEHICLES
Eric Bernard Parkes, Selly Oak, England, assignor to Joseph Lucas (Industries) Limited, Birmingham, England, a British company
Filed Aug. 21, 1968, Ser. No. 754,245
Claims priority, application Great Britain, Aug. 25, 1967, 39,247/67
Int. Cl. B60g 1/38
U.S. Cl. 340—81         3 Claims

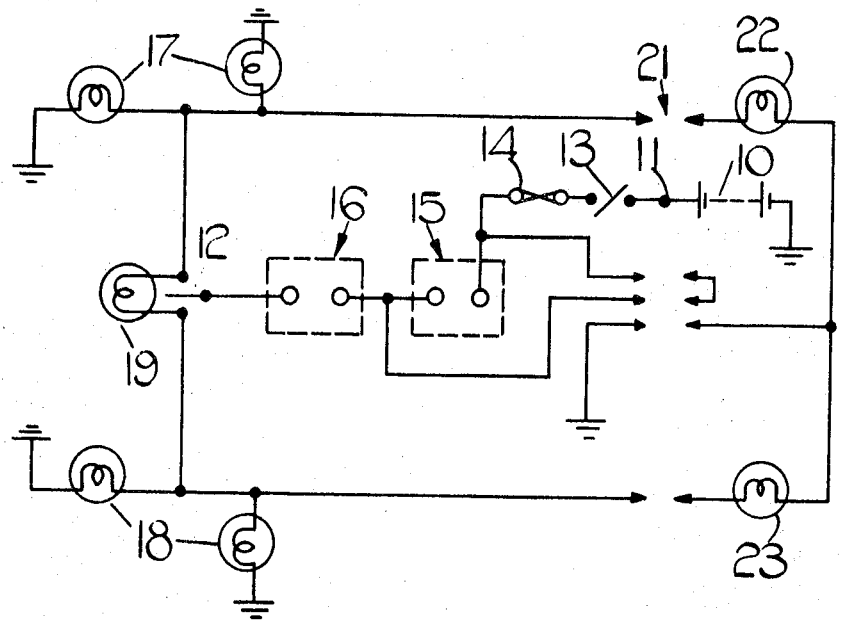

ABSTRACT OF THE DISCLOSURE

A direction indicator system for a tractor-trailer vehicle includes a switch on the tractor for energising the tractor lamps by way of a circuit including first and second flasher units, the first flasher unit only being operative when the tractor lamps alone are energised because the current flow through the second flasher unit is insufficient to energise it. When the trailer is coupled the first flasher unit is short-circuited and the second flasher unit alone operates.

---

This invention relates to a direction indicator system for a tractor-trailer vehicle.

A system according to the invention comprises a direction indicator switch on the tractor through which the direction indicator lamps on the tractor can be energised, a supply terminal on the tractor, first and second flasher units connected in series between the supply terminal and the movable contact of the direction indicator switch, each of said flasher units requiring a minimum current flow therethrough to operate the flasher unit and the current flowing when the tractor indicator lamps only are energised being insufficient to operate the second flasher unit, so that the frequency of operation is determined by the first flasher unit, plug and socket means on the tractor and trailer, the plug and socket means serving when engaged to connect the flasher lamps at opposite sides of the trailer in parellel with the flasher lamps at opposite sides of the tractor respectively, and switch means for short circuiting the first flasher unit, the current flow when the tractor and trailer indicator lamps are both energised being sufficient to operate the second flasher unit, and the flasher units being chosen to provide the desired frequency of operation irrespective of whether the plug and socket means is engaged.

It is essential that the flasher units should be of the kind in which there is a minimum current required to operate the flasher unit at all. So-called popple-type flasher units are suitable for this purpose, such units including a metallic vane having a constraining band which ensures that the vane has two stable positions between which it snaps as the band is heated and cooled. Such flasher units are very well known, and will not therefore be described in detail.

The accompanying drawing is a circuit diagram illustrating one example of the invention.

Referring to the drawing, there is provided a terminal 11 which is connected to one side of the vehicle battery 10, the other side of the vehicle battery being earthed. The terminal 11 is connected to the movable contact 12 of the direction indicator switch of the vehicle through the ignition switch 13, a fuse 14, a flasher unit 15, and a second flasher unit 16. The flasher units are of the popple-type as explained above, and in a typical configuration the unit 15 requires a current of 3.6 amps to operate it, while the unit 16 requires a current of 5.3 amps to operate it. The movable contact 12 of the direction indicator switch can be operated to energise the flasher lamps 17, 18 on opposite sides of the vehicle in the usual way, and a warning lamp 19 is connected across the fixed contacts of the direction indicator switch to give an indication when the flasher lamps are operating.

All the components thus far described are on the tractor, and the tractor and trailer are provided with a plug and socket device indicated generally by the reference numeral 21. When the plug and socket device is interconnected, the flasher lamps 22, 23 on the trailer are connected in parallel with the lamps 17, 18 respectively, and the unit 15 is short-circuited.

In operation, presuming that no trailer is connected to the tractor so that the plug and socket 21 is not engaged, operation of the direction indicator switch causes current to flow through the units 15, 16, but the current is insufficient to operate the unit 16. The flashing rate is therefore determined solely by the unit 15. However, if a trailer is in use and the plug and socket 21 is engaged, the unit 15 is short-circuited, and the current flow through the unit 16 is increased by virtue of the additional lamps so that the unit 16 is operative and determines the flashing rate. The two units 15, 16 are of course chosen to provide a flashing rate which is substantially constant irrespective of whether the trailer is connected or not.

In a modification, the switch which short-circuits the unit 15 is a manually operable switch on the tractor, and is independent of the plug and socket connector. If at any time the switch is left in the incorrect position, the flashing rate will vary substantially from the correct rate, so give an indication to the driver that the switch is not in the correct position.

Having thus described my invention what I claim as new and desire to secure by Letters Patent is:

1. A direction indicator system for a tractor-trailer vehicle, comprising a direction switch on the tractor through which the direction indicator lamps on the tractor can be energised, a supply terminal on the tractor, first and second flasher units connected in series between the supply terminal and the movable contact of the direction indicator switch, each of said flasher units requiring a minimum current flow therethrough to operate the flasher unit and the current flowing when the tractor indicator lamps only are energised being insufficient to operate the second flasher unit, so that the frequency of operation is determined by the first flasher unit, plug and socket means on the tractor and trailer, the plug and socket means serving when engaged to connect the flasher lamps at opposite sides of the trailer in parallel with the flasher lamps at opposite sides of the tractor respectively, and switch means for short-circuiting the first flasher unit, the current flow when the tractor and trailer indicator lamps are both energised being sufficient to operate the second flasher unit, and the flasher units being chosen to provide the desired frequency of operation irrespective of whether the plug and socket means is engaged.

2. A system as claimed in claim 1 in which the switch means is manually operable.

3. A system as claimed in claim 1 in which the switch means is operated automatically on engagement of the plug and socket means.

References Cited
FOREIGN PATENTS
1,101,962   8/1963   Great Britain _____ 340—81

DONALD J. YUSKO, Primary Examiner
K. N. LEIMER, Assistant Examiner

U.S Cl. X.R.
340—73